US008404121B2

(12) United States Patent
Bias et al.

(10) Patent No.: US 8,404,121 B2
(45) Date of Patent: Mar. 26, 2013

(54) METHOD FOR SEPARATING SUSPENDED SOLIDS FROM A WASTE FLUID

(75) Inventors: Joel Bias, Southgate, MI (US); Brian Ross, Lansing, MI (US)

(73) Assignee: Anaergia Inc., Burlington, Ontario (CA)

( * ) Notice: Subject to any disclaimer, the term of this patent is extended or adjusted under 35 U.S.C. 154(b) by 751 days.

(21) Appl. No.: 12/462,878

(22) Filed: Aug. 11, 2009

(65) Prior Publication Data

US 2011/0036779 A1 Feb. 17, 2011

(51) Int. Cl.
 *C02F 1/24* (2006.01)
(52) U.S. Cl. ........ 210/703; 210/744; 210/109; 210/143; 210/221.1
(58) Field of Classification Search .................. 210/744, 210/703, 109, 143, 221.1, 221.2
See application file for complete search history.

(56) References Cited

U.S. PATENT DOCUMENTS

| | | | |
|---|---|---|---|
| 3,694,353 A | 9/1972 | Yang | |
| 3,772,188 A | 11/1973 | Edwards | |
| 3,963,624 A | 6/1976 | Henderson et al. | |
| 4,093,539 A | 6/1978 | Guarino | |
| 4,554,687 A | 11/1985 | Carter et al. | |
| 4,752,399 A | 6/1988 | Viator | |
| 4,800,025 A * | 1/1989 | Bibaeff | 210/703 |
| 4,834,878 A | 5/1989 | Anderson | |
| 4,956,080 A | 9/1990 | Josefik | |
| 5,011,597 A * | 4/1991 | Canzoneri et al. | 210/104 |
| 5,015,384 A | 5/1991 | Burke | |
| 5,049,252 A | 9/1991 | Murrell | |
| 5,080,802 A | 1/1992 | Cairo et al. | |
| 5,156,745 A | 10/1992 | Cairo et al. | |
| 5,246,583 A | 9/1993 | Nishida | |

(Continued)

FOREIGN PATENT DOCUMENTS

| | | |
|---|---|---|
| EP | 1716927 | 2/2006 |
| GB | 1459195 | 12/1976 |

OTHER PUBLICATIONS

Sheff, B. and Ross, B., Closed System Nutrient Recovery Cell: Case Study of Advanced Treatment of Dairy Digester Effluent, Presentation at 2008 ASABE Annual International Meeting; Paper No. 085308, Jun. 29-Jul. 2, 2008.

(Continued)

*Primary Examiner* — Thomas M Lithgow
(74) *Attorney, Agent, or Firm* — Scott Pundsack; Borden Ladner Gervais LLP

(57) ABSTRACT

The disclosure relates to a separation process. An aerated inlet mixture of fluid and solids is fed to a flotation separation vessel and is separated into an upper float layer and a lower clarified layer. The upper float layer is withdrawn from the vessel when the height of the upper float layer exceeds the height of an overflow conduit and forms a concentrated solids effluent. The lower clarified layer is withdrawn from the separation vessel as a clarified fluid effluent. The separation process is performed continuously using a control process that maintains a relatively stable distribution between the lower clarified layer and the upper float layer. The control process is a closed loop process that monitors the instantaneous height of the vessel contents and computes an error function based on the instantaneous height and a set-point height. The error function is used to periodically adjust the outlet flowrate of the clarified fluid effluent. The resulting process has improved stability (e.g., being continuously operable without interruption and/or operable for extended periods between intermittent cleaning processes) and provides a concentrated solids effluent with solids concentrations higher than those previously attainable in similar separation processes.

17 Claims, 5 Drawing Sheets

U.S. PATENT DOCUMENTS

| | | | |
|---|---|---|---|
| 5,507,946 | A | 4/1996 | Stearns |
| 5,647,977 | A | 7/1997 | Arnaud |
| 5,670,047 | A | 9/1997 | Burke |
| 5,766,484 | A | 6/1998 | Petit et al. |
| 5,846,413 | A | 12/1998 | Krofta |
| 6,083,404 | A | 7/2000 | Sommese |
| 6,113,786 | A | 9/2000 | Burke |
| 6,113,789 | A | 9/2000 | Burke |
| 6,126,815 | A | 10/2000 | Kelada |
| 6,206,203 | B1 | 3/2001 | Hopkins |
| 6,299,774 | B1 | 10/2001 | Ainsworth et al. |
| 6,309,547 | B1 | 10/2001 | Burke |
| 6,337,023 | B1 * | 1/2002 | Broussard et al. ............ 210/703 |
| 6,358,398 | B1 | 3/2002 | Halldorson |
| 6,453,939 | B1 * | 9/2002 | Cook et al. .................... 137/392 |
| 6,464,875 | B1 | 10/2002 | Woodruff |
| 6,500,340 | B1 | 12/2002 | Burke |
| 6,569,332 | B2 | 5/2003 | Ainsworth et al. |
| 6,613,231 | B1 | 9/2003 | Jitariouk |
| 6,616,844 | B2 | 9/2003 | Park et al. |
| 6,676,716 | B2 | 1/2004 | Fujimura |
| 6,719,903 | B1 | 4/2004 | Pressley |
| 6,733,674 | B2 | 5/2004 | Sarkar |
| 6,773,603 | B2 | 8/2004 | Moorehead |
| 6,814,877 | B2 | 11/2004 | Gargas |
| 6,849,201 | B2 | 2/2005 | Inagaki et al. |
| 6,866,779 | B1 | 3/2005 | Burke |
| 6,893,572 | B2 | 5/2005 | Burke |
| 6,911,149 | B2 | 6/2005 | Hansen et al. |
| 6,982,036 | B2 | 1/2006 | Johnson |
| 7,001,525 | B2 | 2/2006 | Binot |
| 7,153,427 | B2 | 12/2006 | Burke |
| 7,186,335 | B2 | 3/2007 | Langhans |
| 7,300,584 | B2 | 11/2007 | Langhans |
| 7,306,733 | B2 | 12/2007 | Olivier |
| 7,384,573 | B2 | 6/2008 | Brummett |
| 7,404,900 | B2 | 7/2008 | Bradley |
| 7,419,601 | B2 | 9/2008 | Cooper |
| 2001/0032812 | A1 | 10/2001 | Morse |
| 2001/0052499 | A1 | 12/2001 | Niijima |
| 2002/0195398 | A1 | 12/2002 | Morse et al. |
| 2003/0052061 | A1 | 3/2003 | Burke |
| 2003/0146523 | A1 | 8/2003 | Morse et al. |
| 2003/0173288 | A1 | 9/2003 | Arnaud |
| 2004/0026326 | A1 | 2/2004 | Hosaka |
| 2004/0069724 | A1 | 4/2004 | Morse et al. |
| 2004/0099607 | A1 | 5/2004 | Leffler et al. |
| 2004/0149661 | A1 | 8/2004 | Park |
| 2005/0145569 | A1 | 7/2005 | Ulmert |
| 2006/0243604 | A1 | 11/2006 | Nakagawa |
| 2007/0102352 | A1 | 5/2007 | Burke |
| 2007/0256972 | A1 | 11/2007 | Imai |
| 2007/0289912 | A1 | 12/2007 | Pollock |
| 2008/0142451 | A1 | 6/2008 | Rusnack et al. |
| 2008/0190859 | A1 | 8/2008 | Stoermann |

OTHER PUBLICATIONS

International Search Report and the Written Opinion of the International Searching Authority dated Oct. 14, 2010, for Application No. PCT/US10/02191.

* cited by examiner

METHOD FOR SEPARATING SUSPENDED SOLIDS FROM A WASTE FLUID

BACKGROUND OF THE DISCLOSURE

1. Field of the Disclosure

The disclosure relates to a separation method for suspended solids. The method can be applied to a gas flotation separator that does not include a mechanical means (e.g., rakes, skimmers) for removing a float layer of aerated solids. The method employs a control process using the instantaneous height of fluid in the separator to control the effluent flow rate of clarified liquid from the separator to achieve a steady and continuous operation of the separation process.

The separation method can generally be used to treat wastewater. For example, the separation method can be used in a solids and nutrient recovery system for applications that require partitioning of the solid and liquid phases of effluents from food processing residuals and waste, residuals from animal feeding operations, and the effluent from the digestion of these residuals. Specific applications include the separation of suspended solids from the effluent of anaerobic digesters where the separation may be driven by ambient air (or other gas, for example biogas) or where the suspended solids are of a fragile or delicate nature that would otherwise be disturbed by mechanical removal methods. The recovered suspended solid emulsion may be recycled as a feed substrate to digesters for the generation of biogas for power generation.

2. Brief Description of Related Technology

The separation of solids and liquids is prevalent in wastewater treatment. Generally the separation involves a first mechanical step (e.g., filtering of settleable solids) and then proceeds to a more aggressive phase separation prior to final treatment. Thus, after some type of mechanical separation, the wastewater treatment generally includes the recovery of suspended solids or emulsions that exist in the particle range between settable solids and dissolved solids. In a dissolved gas floatation device (generically a "DAF" device, even when the dissolved gas is other than air), the solid/liquid mixture to be separated is treated with chemicals, and then fine bubbles in the range of 10 to 20 microns are introduced to the mixture. The solid/liquid mixture is then directed to an open separation tank for buoyant separation. A float layer of aerated solids rises to the top of the separation tank and is skimmed from the top of the separation tank contents with a mechanical rake (or other mechanical collection means). The result is a clear or generally clear effluent and a concentrated solids emulsion.

Separation using principles of buoyancy (e.g., flotation separation) is advantageous because it achieves high capture rates while producing a clean effluent. Flotation separation can also concentrate or recycle the waste solids. Concentrated waste streams are desirable to minimize the size of downstream processing facilities. Maximizing the float solids concentration is advantageous since the solids concentration affects downstream processing resources and cost. If the solids produced are dilute, the downstream dewatering or disposal costs increase. If the separator is used in a biological process incorporating solids recycled from the separator, the processing cost and reactor size are greater if dilute solids are produced.

Flotation separation can be used for both clarification and thickening. Flotation separation can remove suspended solids, colloids, and oil and grease at the same time. Flocculation and coagulation agents can be added to the flotation stream to consolidate solids and remove nutrients, as well as bacteria and other organisms. Flotation separation takes advantage of the hydrophobic interactions that are lacking in other separation technologies.

The use of mechanical float harvesting methods and/or devices is often unsuitable for the separation of delicate or fragile emulsions (e.g., since the harvesting means can destroy the emulsion) or when it is desired to maintain anaerobic conditions of the emulsion (e.g., since mechanical harvesting systems are generally open to the ambient environment), for example when the separated solids are to be recycled to an anaerobic digester for further use and processing.

U.S. Patent Publication No. 2008/0190859, the contents of which are incorporated herein in their entirety, describes a DAF separator without mechanical float harvesting means. The disclosed cylindrical separator includes tangential feed inlets to generate a swirling flow and a corresponding centrifugal force that drives a float layer of aerated solids radially inward toward a central weir for collection of the concentrated solid effluent.

OBJECTS

Solid/liquid separation processes are desirably operated in a continuous mode (i.e., as opposed to a batch or mode). However, the foregoing processes are difficult to operate continuously because many normal process variations (e.g., inlet flow rate; inlet solids type/content, charge, and density; aerating gas feed rate; coagulation and flocculation agent feed rates) cause the resulting conditions within a separator to be unsteady. The desired distribution between aerated solids (e.g., in an upper float layer) and clarified liquid (e.g., in a lower clarified layer) present in the separator can vary with time. Failure to accurately control the distribution between the two separation phases can undesirably lead to aerated solids exiting through the clarified liquid effluent and/or clarified liquid exiting via the aerated solids outlet.

Such problems can be addressed by operating the separator in a batch or semi-batch mode. For example, an operator can intermittently initiate a clean cycle in which the inlet flow to the separator is increased to flush accumulating aerated float solids through the solids outlet. However, the clean cycle interrupts the efficient continuous operation of the separator, because a substantial portion of the inlet cleaning fluid exits with the flushed solids, thereby undesirably diluting the aerated float solids. Attempts at controlling the separation process (e.g., by attempting to balance inlet and clarified effluent flow rates in the DAF separator of U.S. Patent Publication No. 2008/0190859) have met limited success, resulting in an unsteady distribution between aerated solids and clarified liquid, thereby still requiring frequent cleaning cycles (e.g., 15-minute cleaning cycles approximately every 1-2 hours).

There is a need for solid/liquid separation processes (e.g., DAF separation processes) that can be reliably operated in a continuous mode with minimal or no process interruptions (e.g., by minimizing or eliminating the need for intermittent cleaning cycles). As a complement to this, there is also a need for control processes that permit accurate control of the distribution between aerated float solids and clarified liquid present in the separator. These and other objects may become increasingly apparent by reference to the following description and drawings.

SUMMARY

The disclosure relates to a separation process. An aerated inlet mixture of fluid and solids is fed to a flotation separation vessel and is separated into an upper float layer and a lower clarified layer. The upper float layer is discharged from the vessel when the height of the upper float layer exceeds the height of an overflow conduit (or barrier/wall) and forms a concentrated solids effluent. The lower clarified layer is withdrawn from the separation vessel as a clarified fluid effluent. The separation process is performed continuously using a control process that maintains a relatively stable distribution between the lower clarified layer and the upper float layer. The control process is a closed loop process that monitors the instantaneous height of the vessel contents and computes an error function based on the instantaneous height and a setpoint height. The error function is used to periodically adjust the outlet flowrate of the clarified fluid effluent. The resulting process has improved stability (e.g., being continuously operable without interruption and/or operable for extended periods between intermittent cleaning processes) and provides a concentrated solids effluent with solids concentrations higher than those previously attainable in similar separation processes.

In an embodiment, a separation process (e.g., to separate solids from a waste stream) comprises several steps, for example (a) providing a separation vessel comprising (i) a fluid inlet, (ii) a solids outlet comprising an overflow conduit having a height $h_w$ measured from a base portion of the separation vessel, and (iii) a fluid outlet at a first position between the base portion and $h_w$; (b) feeding an aerated inlet mixture to the separation vessel via the fluid inlet at a flowrate $Q_i$, the aerated inlet mixture comprising (i) a fluid, (ii) a solid contaminant, and (iii) an aerating gas; (c) separating the inlet mixture in the separation vessel into (i) an upper float layer comprising aerated solids and being located at a second position, and (ii) a lower clarified layer comprising a clarified fluid and being located at a third position, the second position being relatively further away from the base portion of the separation vessel than the third position; (d) withdrawing the upper float layer from the separation vessel via the overflow conduit; and (e) withdrawing the lower clarified layer from the separation vessel via the fluid outlet at a selected flowrate $Q_o$. Parts (a)-(e) of the separation process are performed as a continuous separation process with a control process comprising: (i) selecting an operating height $h_o$ that is larger than $h_w$; (ii) measuring an instantaneous height h(t) of the separation vessel contents (e.g., with a pressure transducer mounted in the separation vessel); (iii) adjusting the flowrate $Q_o$ based on a first error function h(t)-$h_o$ to minimize the first error function; and (iv) repeating (i)-(iii) of the control process. A PID controller can be used to adjust the flowrate $Q_o$, for example using a proportional valve in fluid communication with the fluid outlet. The operating height can be suitably selected so that a height ratio $(h_o-h_w)/h_w$ is about 0.05 or less (for example about 0.02, or less, about 0.01 or less, about 0.005 or less, about 0.001 to about 0.006, or about 0.002 to about 0.005 in various alternative embodiments).

The separation vessel can generally have a cylindrical (preferred) or rectangular geometry. In an embodiment of a generally cylindrical vessel, (i) the separation vessel comprises a cylindrical outer wall generally defining a central axis; (ii) the fluid inlet comprises one or more tangential inlets distributed around the cylindrical outer wall, thereby generating a swirling flow when feeding the aerated inlet mixture to the separation vessel; and (iii) the overflow conduit comprises a cylindrical weir generally aligned with the central axis. The separation vessel can be closed to the external environment, thereby preventing the loss of nitrogen compounds, the release noxious odors, as well as the contamination of the solids overflow (e.g., with air or oxygen).

During operation, the aerating gas can comprise one or more of air, nitrogen, oxygen, carbon dioxide, methane, and biogas. In some embodiments, however, the aerating gas is substantially free of oxygen. The aerating gas and the solids can be electrostatically coupled to each other, for example using an ionized aerating gas and/or one or more of coagulating and/or flocculating agents in the inlet mixture. The coagulating agent can be selected from the group consisting of alum, aluminum chlorohydrate, aluminium sulfate, calcium oxide, calcium hydroxide, iron(III) chloride, iron(II) sulfate, sodium aluminate, sodium silicate, and combinations thereof. The flocculating agent can be selected from the group consisting of polyacrylamide, carbonic or anionic forms thereof, polydiallyldimethylammonium chloride, and combinations thereof. Alternatively or additionally, the coagulating agent can comprise one or more metal salt cations selected from the group consisting of aluminum, iron, calcium, sodium, and magnesium. In various embodiments, the aerated inlet mixture comprises about 1 wt. % to about 5 wt. % total solids, the lower clarified layer withdrawn via the fluid outlet comprises about 1 wt. % or less total solids, and/or the upper float layer withdrawn via the overflow conduit comprises at least about 5 wt. % total solids.

The continuous separation process preferably is performed without a cleaning cycle or other intermittent process. In an embodiment, however, the separation process can comprise performing successive cycles of the control process followed by a cleaning process, where the cleaning process comprises: (i) selecting a cleaning height $h_c$ that is larger than $h_o$; (ii) measuring an instantaneous height h(t) of the separation vessel contents; (iii) adjusting the flowrate $Q_o$ based on a second error function h(t)-$h_c$ to minimize the second error function; and (iv) repeating (i)-(iii) of the cleaning process for a selected cleaning time before resuming the control process. The instantaneous height h(t) can be measured and the flowrate $Q_o$ can be adjusted in the same manner as above. The cleaning height can be selected so that a height ratio $(h_c-h_w)/h_w$ is about 0.05 or more.

In another embodiment, a separation process comprises several steps, for example (a) providing a separation vessel comprising (i) a cylindrical outer wall generally defining a central axis, (ii) a fluid inlet comprising one or more tangential inlets distributed around the cylindrical outer wall and capable of generating a swirling flow when feeding an inlet mixture to the separation vessel, (iii) a solids outlet comprising a cylindrical weir generally aligned with the central axis and having a height $h_w$ measured from a base portion of the separation vessel, and (iv) a fluid outlet at a first position between the base portion and $h_w$; (b) feeding an aerated inlet mixture to the separation vessel via the fluid inlet at a flowrate $Q_i$, the aerated inlet mixture comprising (i) a fluid, (ii) a solid contaminant, and (iii) an aerating biogas; (c) separating the inlet mixture in the separation vessel into (i) an upper float layer comprising aerated solids and being located at a second position, and (ii) a lower clarified layer comprising a clarified fluid and being located at a third position, the second position being relatively further away from the base portion of the separation vessel than the third position; (d) withdrawing the upper float layer from the separation vessel via the cylindrical weir; and (e) withdrawing the lower clarified layer from the separation vessel via the fluid outlet at a selected flowrate $Q_o$. Parts (a)-(e) of the separation process are performed as a continuous separation process with a control process comprising: (i) selecting an operating height $h_o$ that is larger than $h_w$; (ii) measuring an instantaneous height h(t) of the separation vessel contents with a pressure transducer mounted within the separation vessel; (iii) adjusting the flowrate $Q_o$ with a proportional valve in fluid communication with the fluid outlet based on a first error function h(t)-$h_o$ to minimize the first error function; and (iv) repeating (i)-(iii) of the control process.

Any of the foregoing process embodiments can be integrated into a separation system. The separation system generally includes: (a) providing a separation vessel comprising (i) a fluid inlet, (ii) a solids outlet comprising an overflow conduit having a height $h_w$ measured from a base portion of the separation vessel, (iii) a fluid outlet at a first position between the base portion and $h_w$, and (iv) a means for measuring an instantaneous height h(t) of the separation vessel contents (e.g., pressure transducer), the measurement means being mounted on the separation vessel at a second position between the base portion and $h_w$; (b) a means for adjusting a flowrate $Q_o$ of fluid out of the separation vessel (e.g., proportional valve) through the fluid outlet, the adjusting means being in fluid communication with the fluid outlet; and, (c) an electronic controller (e.g., P, PI, PD, PID) comprising (i) an input in electrical communication with the measuring means and (ii) an output in electrical communication with the adjusting means. The separation vessel can further include any of the specific geometric features described above.

All patents, patent applications, government publications, government regulations, and literature references cited in this specification are hereby incorporated herein by reference in their entirety. In case of conflict, the present description, including definitions, will control.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1:
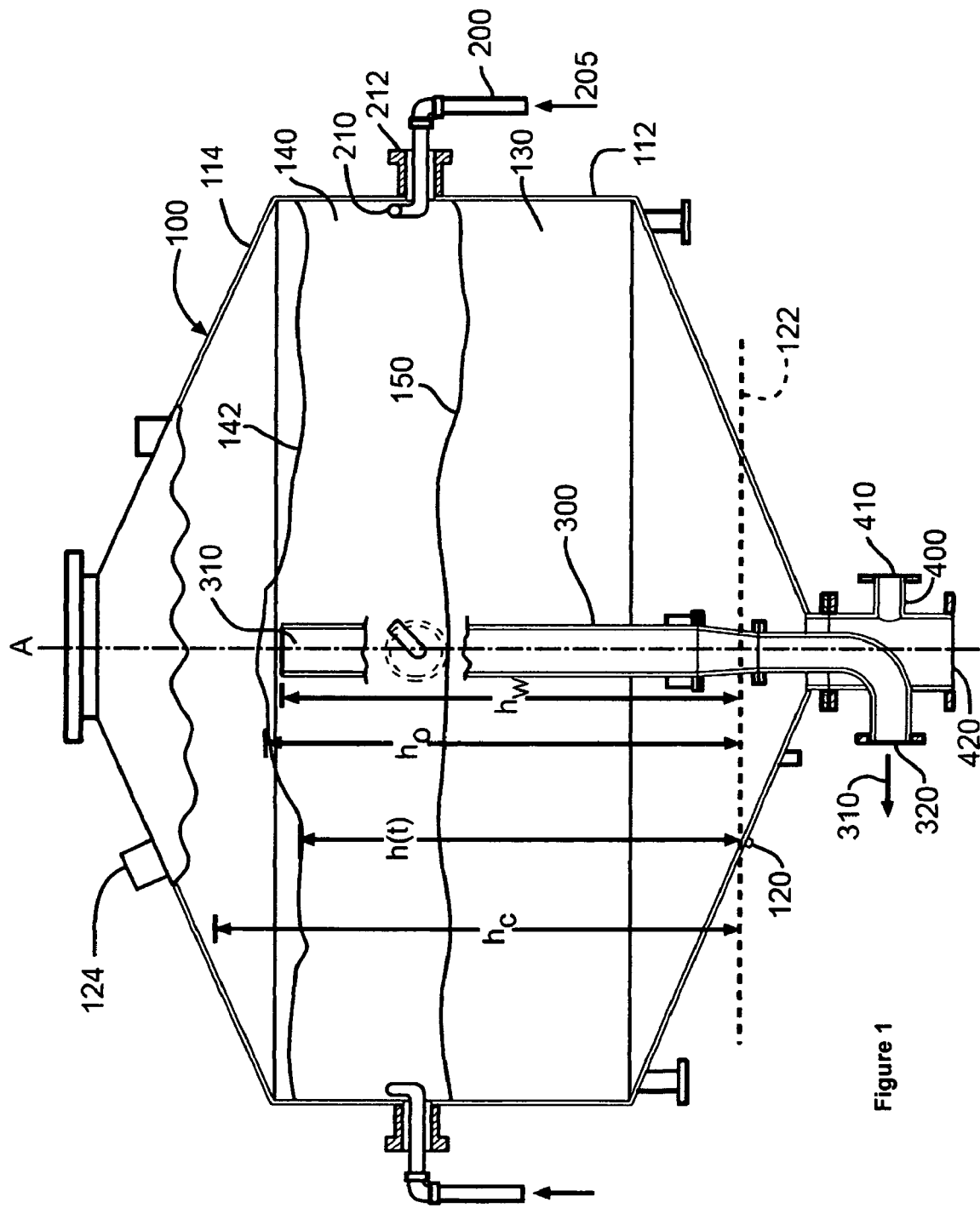
FIG. 1 is a side cross-sectional view of a separation vessel suitable for use in the disclosed process.

While the disclosed compositions and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

The present disclosure relates to a separation process, for example using a separation vessel 100 as illustrated FIG. 1. An aerated inlet mixture 205 is fed to the separation vessel 100 via a fluid inlet 200 at an inlet volumetric flowrate $Q_i$. The aerated inlet mixture 205 is separated into an upper float layer 140 and a lower clarified layer 130 as a result of buoyant separation forces and residence time within the separation vessel 100. A portion of the upper float layer 140 is withdrawn/discharged from the separation vessel 100 when the height of the upper float layer 140 exceeds the height of an overflow conduit 300, thereby resulting in a concentrated solids effluent 310 that exits from the separation vessel 100 via a weir outlet 320. A portion of the lower clarified layer 130 is withdrawn from the separation vessel 100 via a fluid outlet 400 as a clarified fluid effluent 410 at an outlet volumetric flowrate $Q_o$.

The separation process is performed as a continuous separation process using a control process that maintains a relatively stable distribution between the lower clarified layer 130 and the upper float layer 140 in the separation vessel 100. The control process is a closed loop process that monitors the instantaneous height h(t) of the separation vessel 100 contents (e.g., the combined height of the lower clarified layer 130 and the upper float layer 140). An error function based on the instantaneous height and a set-point height is used to periodically adjust the outlet volumetric flowrate $Q_o$. The resulting process has improved stability, for example being continuously operable without interruption and/or operable for extended periods between intermittent cleaning processes.

Separation Vessel

In an embodiment, the separation vessel 100 has a generally cylindrical interior volume defined by a cylindrical outer wall 112 circumferentially attached a base portion 110. As illustrated, the base portion 110 can have a gradual downward slope (e.g., about 15° to about 30°, relative to a horizontal plane) to facilitate solids settling and collection for later purging through a solids purge outlet 420 that is generally closed during operation but can be intermittently opened to remove accumulated solids (e.g., draining by gravity). While the fluid outlet 400 can be variably positioned within the separation vessel 100 (e.g., at a point below the top of the overflow conduit 300, possibly including more than one outlet orifice), the fluid outlet 400 is preferably a single outlet (e.g., a cylindrical outlet pipe for the clarified fluid effluent 410) located at the base of the separation vessel 100. Preferably, the separation vessel 100 is an integral tank that is closed to the external environment, for example with a top portion 114 attached to the cylindrical outer wall 112. The top portion 114 can have an angled, frustoconical shape similar to that of the base portion 110.

The overflow conduit 300 illustrated in FIG. 1 is a cylindrical weir that is generally aligned with a central axis A defined by the cylindrical outer wall 112 (i.e., the cylindrical weir 300 and the cylindrical outer wall 112 are generally co-axial, and the outer wall 112 generally has a height that is greater than that of the cylindrical weir 300). The cylindrical weir 300 is a wall/barrier that provides a collection point for the aerated solids originally present in the vessel 100 feed. The cylindrical weir 300 is generally tubular in shape and has an opening at its top end located within the vessel 100 interior. The opening within the cylindrical weir 300 permits the aerated solids that contact the weir 300 to pass into the opening and exit the vessel 100. In an embodiment, the recovered aerated solids can be further processed to generate biogas (e.g., as an energy source) or can be used as a fertilizer.

As illustrated, the fluid inlet 200 can include a plurality of tangential inlets 210 (e.g., 2 to 8 inlets) distributed around the cylindrical outer wall 112 of the separation vessel 100. The tangential inlets 210 are preferably located at a position that is axially between the top of the overflow conduit 300 and the fluid outlet 400. The aerated inlet mixture 205 is tangentially fed into the separation vessel 100 through the tangential inlets 210. The inlet volumetric flowrate $Q_i$ of the aerated inlet mixture 205 is preferably selected to maintain a substantially constant flow at the outer circumference of the separation vessel 100 and to generate a rotating, swirling flow inside the vessel 100 (e.g., having a substantial tangential velocity component $u_\theta$). Once the aerated inlet mixture 205 is released into the vessel 100, buoyant separation occurs with aerated solids rising to form the upper float layer 140. The upper float layer 140, as a result of the radial centrifugal forces generated by the tangential inlets 210 and the buoyant lift created by the aerating gas bubbles, flows axially upward (i.e., relative to gravity) and radially inward (i.e., relative to the central axis A) to the center of the vessel 100 where the float passes over the top of the cylindrical weir 300. The concentrated solids effluent 310 is subsequently removed from the tank through the weir outlet 320 located at the bottom, external end of the cylindrical weir 300. The lower clarified layer 130 remaining in the vessel 100 is recovered through the fluid outlet 400 as the clarified fluid effluent 410.

Figure 2:
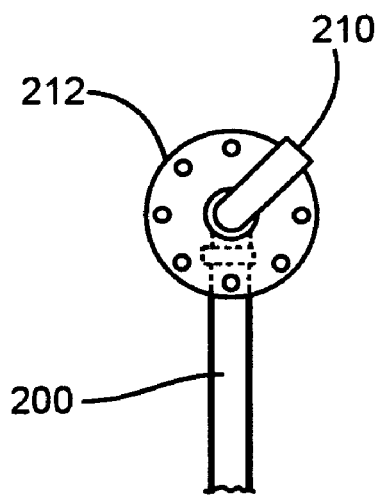
FIG. 2 is a detailed view of a tangential inlet for the separation vessel of FIG. 1.
Figure 3:
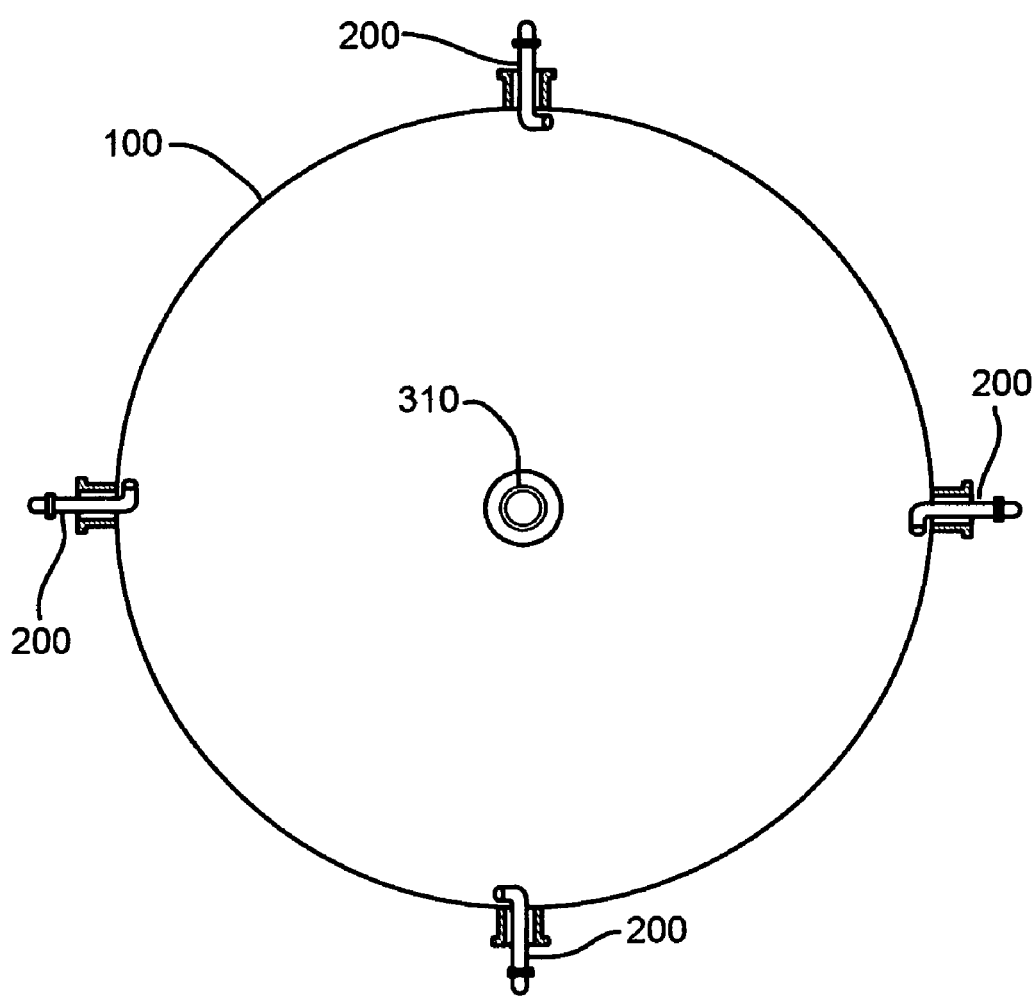
FIG. 3 is a top cross-sectional view of the separation vessel of FIG. 1.

The tangential inlets 210 through which the aerated inlet mixture 205 is introduced into the separation vessel 100 are preferably oriented such that the feed enters the vessel at an upward angle (i.e., tangentially and upwardly relative to gravity). The angled design of the tangential inlets 210 imparts a swirling, rotational flow to the aerated inlet mixture 205 upon is entry into the vessel 100. As illustrated in FIG. 2, the portion of the tangential inlets 210 located within the vessel is angled upwardly (e.g., about 30° to about 60°, or about 45°) relative to a horizontal plane perpendicular to the central axis A. The tangential inlets 210 are preferably attached to the cylindrical outer wall 112 of the vessel 100 via an adjustable flange 212 that permits the entry angle for the tangential inlets 210 to be easily selected and adjusted based on a given application.

The specific dimensions of the separation vessel are not particularly limited, and the vessel can be suitably scaled to meet the demands of a particular application (e.g., volumetric flow rate throughput, inlet velocities, separation residence time). For the separation vessel 100 illustrated in FIG. 1, an aspect ratio (e.g., total vessel 100 height including the top, cylindrical, and bottom portion relative to the vessel 100 diameter) is preferably about 1 or less, for example ranging from about 0.1 to about 2, about 0.2 to about 1, or about 0.4 to about 0.8. Alternatively, the aspect ratio expressed as the height/diameter ratio of just the cylindrical portion defined by the cylindrical wall 112 is preferably about 0.5 or less, for example ranging from about 0.05 to about 1, about 0.1 to about 0.5, or about 0.2 to about 0.4. The low aspect ratio provides a relatively longer radial path for the inward migration toward the cylindrical weir 300 of aerated solids that enter the vessel 100 at the outer cylindrical wall 112, thereby increasing the effective residence time for buoyant separation of the solids. In a suitable embodiment, the vessel 100 has a steel construction with an epoxy coating and has an outer diameter of about 13 ft (400 cm) and a total height of about 10 ft (305 cm), and the various inlet/outlet pipes and weirs can be suitably sized to accommodate application specific flow rates (e.g., a tangential inlet diameter of about 2 in (5.1 cm), an overflow weir diameter of about 8 in (20.3 cm), and a clarified fluid effluent diameter of about 4 in (10.2 cm). Depending on the solids content of the influent, inlet flow rates of about 50 gpm to about 200 gpm are common for the 13-ft separation vessel, and the inlet flow is commonly partitioned with about 50% to about 99% (or about 50% to about 90%) of the flow removed as the clarified fluid effluent and with about 1% to about 50% (or about 10% to about 50%) of the flow removed as the concentrated solids effluent.

The separation vessel 100 illustrated in the embodiment of FIG. 1 and described above is generally cylindrical in design to incorporate both buoyant and centrifugal separation forces. However, the separation process with its accompanying control process can be performed in other, non-cylindrical separation vessels, for example a separation vessel having a generally rectangular geometry (e.g., as illustrated and described in U.S. Patent Publication No. 2002/0195398, incorporated herein by reference). In such cases, an aerated inlet mixture generally enters the separation vessel at one end of the vessel and flows horizontally toward an overflow conduit (e.g., wall/barrier defining a trough that provides an outlet for the concentrated solids effluent) at an opposing end of the vessel. The residence time in the vessel allows buoyant separation of aerated solids in the inlet feed (e.g., into the upper float layer and the lower clarified layer as above), and the aerated solids can be collected (e.g., using a mechanical collector such as a rake or scraper) via the overflow conduit. Similarly, the lower clarified layer is withdrawn from the separation vessel as the lower clarified effluent.

Inlet Mixture

The aerated inlet mixture includes a fluid, solids (e.g., settleable, suspended, dissolved) and/or nutrient contaminants in the fluid, and an aerating gas. In some embodiments, an upstream separator (e.g., a screw press) can be used to remove larger solids from the aerated inlet mixture prior to its introduction into the separation vessel, in which case the solids are primarily suspended and dissolved solids (i.e., with little or no settleable solids). The fluid that forms the continuous, suspending medium for the solid contaminant can generally include any liquid or mixture of liquids, but generally includes water (e.g., wastewater).

The type of solid contaminant is not particularly limited, and generally includes small solid particles (e.g., ranging in size between settleable solids, suspended solids, and dissolved solids) which are in the inlet fluid (e.g., suspended or transported as a colloid or due to the motion of the fluid). The disclosed process is effective in separating and removing solid contaminants that are not ordinarily removable from the fluid medium by conventional filtration (e.g., non-filterable residue). In an embodiment, the disclosed process and apparatus are operated to separate solids contaminants at a cut size of about 0.1 μm to about 1 μm (e.g., about 0.4 μm to about 0.5 μm, or about 0.45 μm (i.e., a typical size generally accepted as distinguishing suspended and dissolved solids)). Solids having a characteristic size (e.g., diameter or effective diameter) above the cut size generally are recovered in the concentrated solids effluent, and solids having a characteristic size (e.g., diameter or effective diameter) below the cut size generally are recovered in the clarified fluid effluent (although smaller solids can be removed/recovered with the addition of flocculants). Examples of solids include biomass particles (e.g., sludge effluent from an anaerobic digester, manure, other animal/human waste) and inorganic particles (e.g., sand, clay, silt). The solids can include any type of solid suspension or residual from the processing or treatment of food, or residual from the confined feeding operation of animals (e.g., bovine, avian and swine). The solids also can be from the anaerobic digestion of these same residuals. The solid content of the inlet mixture can vary depending on the particular waste stream to be separated; however, the inlet mixture generally includes about 1 wt. % to about 5 wt. % total solids, for example at least about 2 wt. % or 3 wt. % and/or up to about 3.5 wt. %, 4 wt. %, or 5 wt. % total solids.

The aerating gas facilitates the gas flotation separation of the solid contaminant by attaching to the solid particles (e.g., non-dissolved solids such as suspended solids and/or settleable solids), thereby forming an aggregate mass of solids and aerated gas bubbles. The solid-bubble aggregate has an aggregate density less than that of the inlet mixture's fluid medium. The density difference between the aggregate mass and the fluid medium provides a buoyant force to drive the separation process. The aerating gas is generally added to the inlet fluid as a dissolved gas at an elevated pressure (i.e., relative to the operating pressure of the separation vessel) at a point upstream of the fluid inlet through any of the various methods known in the art. The aerating gas is suitably added to the inlet fluid at a rate of about 0.2 scfm to about 2 scfm. Preferably, the aerating gas is added to a recycle stream (e.g., a recycled portion of the clarified fluid effluent) and then mixed with a raw fluid influent to form the inlet fluid fed to the separation vessel. Upon a reduction in pressure (e.g., traversing an orifice plate, using an upstream apparatus such as dissolution tubes, upon entering the separation vessel), the aerated gas leaves solution and forms the aerated gas micro-bubbles. The type of aerating gas is not particularly limited (i.e., it need not include air), for example including one or more of air, nitrogen, oxygen, carbon dioxide, methane, and biogas. Biogas includes the gaseous product of the anaerobic digestion or fermentation of biodegradable materials (e.g., manure, sewage, municipal waste, other biomass) and has methane and carbon dioxide as its primary components. For example, biogas generally includes methane (e.g., about 50-75% (volume or molar basis)), carbon dioxide (e.g., about 25-50%), nitrogen (e.g., up to about 10%), hydrogen (e.g., up to about 1%), hydrogen sulfide (e.g., up to about 3%), and oxygen (e.g., up to about 2%). Biogas is particularly suitable as an aerating gas when the separation vessel is closed to the external environment (i.e., an air environment) and the solids recovered from the overflow weir are recycled to an anaerobic digester, because the anaerobic nature of the recycled material is maintained. In an embodiment, the aerating gas is free or substantially free of oxygen (e.g., less than about 3%, 2%, or 1% oxygen), meaning that the aerated solids recovered from the separation vessel can be additionally processed downstream in an anaerobic digester. In another embodiment, the aerating gas can be ionized (e.g., prior to introduction into the inlet mixture), thereby providing an electrostatic force to promote solid-gas bubble aggregation (e.g., in addition to or in place of any electrostatic forces provided by flocculating agents).

The inlet mixture can include one or more coagulating and/or flocculating agents to promote the aggregation of the solids and the aerated gas bubbles. The treatment of the inlet mixture with the coagulating and/or flocculating agents can place an electrical charge on the solids present in the inlet mixture (e.g., non-dissolved solids such as suspended solids and/or settleable solids), and the electrical charge provides an attractive force between the solids themselves as well as the aerated gas micro-bubbles. Suitable coagulant metal salt cations include aluminum, iron, calcium, sodium, and/or magnesium. Specific coagulating agents can include one or more of alum, aluminum chlorohydrate, aluminium sulfate, calcium oxide, calcium hydroxide, iron(III) chloride, iron(II) sulfate, sodium aluminate, and sodium silicate. Suitable flocculating agents include those generally known in the art, for example including flocculating polymers (e.g., cationic (preferred) or anionic polyacrylamides, polydiallyldimethylammonium chloride (polyDADMAC)). When present, the inlet mixture suitably can include about 1 ppm to about 2,000 ppm coagulant and/or about 1 ppm to about 500 ppm flocculant.

The aerated inlet mixture is preferably formed upstream of the separation vessel. For example, the fluid to be treated (i.e., fluid with a solid contaminant) is first aerated (e.g., in the form of a dissolved gas or gas micro-bubbles, either of which can be ionized in some embodiments), thus forming the aerated inlet mixture. The aerated inlet mixture can then be mixed with coagulant and/or flocculant and fed directly to the separation vessel via the fluid inlet, or can be intermediately fed to a conventional flocculation apparatus (e.g., flocculation tubes; not shown). The flocculation apparatus provides residence time for any flocculating agents and/or ionized gas bubbles to aggregate/flocculate the suspended solids into an emulsion prior to entering the separation vessel.

Process Operation and Control

Within the separation vessel, the aerated inlet mixture generally separates into a light phase (i.e., low-density solid emulsion) and a heavy phase (i.e., high-density liquid effluent). The aerated gas bubbles draw the solids as a low-density solid emulsion float to the top of the vessel where it comes in contact with the overflow conduit/cylindrical weir. With the generally cylindrical vessel and positioning of the tangential inlets, the resulting swirling flow causes the float to migrate toward the center of the vessel, where it exits the vessel via overflow conduit/cylindrical weir. The high-density liquid effluent (clarified fluid) is withdrawn from the vessel bottom. When using a closed separation vessel, the recovered low-density solid emulsion is maintained in the state it was generated (e.g., aerobic, anaerobic, or anoxic) when the aerating gas is suitably selected (e.g., air for aerobic processes, biogas for anaerobic processes). When the separation vessel incorporates swirling flow and a central cylindrical weir, solids recovery mechanisms (e.g., rakes, scrapers) can be omitted, thereby reducing the likelihood of disrupting the delicate solid emulsion (in which case the recovery of solids is reduced) and reducing the likelihood of explosion upon failure of the recovery mechanisms in a closed recovery system (e.g., sparking machines can ignite a methane-rich biogas atmosphere).

As illustrated in FIG. 1, the aerated inlet mixture 205, once fed into the separation vessel 100, generally separates into the upper float layer 140 and the lower clarified layer 130 as a result of buoyant separation forces and residence time within the separation vessel 100. While FIG. 1 illustrates a generally cylindrical vessel 100, a similar stratification of upper and lower layers forms in a vessel having a generally rectangular geometry. The upper float layer 140 generally includes concentrated aerated solids that form a low-density solid emulsion (i.e., less dense than the fluid of the aerated inlet mixture, generally water) and rise to an upper portion of the separation vessel 100 as a result of buoyant forces, where "upper" denotes a position relative to the base portion 110 and the buoyant forces act in a direction opposing gravity. The lower clarified layer 130 generally includes clarified fluid that forms the high-density liquid effluent (i.e., potentially containing some settleable solids or other non-separate dissolved or suspended solids, for example including minute quantities of sand, clay, and/or silt, but having a substantially reduced amount of solids) and collects in a lower portion of the separation vessel 100, where "lower" denotes a position relative to the base portion 110 and indicates that the lower clarified layer 130 is generally between the base portion 110 and the upper float layer 140.

FIG. 1 illustrates an interface 150 between the upper float layer 140 and the lower clarified layer 130 for the sake of clarity. As will be understood, however, the upper float layer 140 and the lower clarified layer 130 need not be so clearly stratified in practice. Often, the aerated solids are most concentrated at a top portion 142 of the upper float layer 140, and the solids concentration (e.g., as measured in a layer having an incremental axial thickness $\Delta h$) decreases gradually at axial positions that are increasingly closer to the base portion 110. Thus, there is a gradual transition between the upper float layer 140 and the lower clarified layer 130, and the fluid that is nearest to the base portion 110 in the lower clarified layer 130 generally has the lowest solids concentration. As illustrated, the interface 150 is located below the inlets 210 (i.e., at an axial position closer to the base portion 110 of the separation vessel 100). However, the interface 150 can be located above the inlets 210, at substantially the same axial level as the inlets 210, for example depending on specific operating parameters of the separation vessel 100 (e.g., solids content of the feed, inlet flow rates). Moreover, the axial position of the interface 150 can vary during operation of the separation vessel 100.

As a result of the separation, the solids concentration of the lower clarified layer 130 is substantially lower than that of the inlet mixture and the solids concentration of the upper float layer 140 is substantially higher than that of the inlet mixture. For example, the portion of the lower clarified layer 130 that is withdrawn via the fluid outlet 400 as the clarified effluent 410 can have about 1 wt. % or less total solids, preferably about 0.04 wt. % to about 1 wt. %, about 0.5 wt. % to about 1 wt. %, or about 0.5 wt. % to about 0.75 wt. % total solids. Similarly, the portion of the upper float layer 140 that is harvested via the cylindrical weir 300 as the concentrated solids effluent 310 can have at least about 5 wt. % (or at least about 7 wt. % or about 8 wt. %) total solids, for example about 6 wt. % to about 11 wt. % total solids, or about 6, 7, or 8 wt. % to about 10, 11, or 12 wt. % total solids. The degree of separation alternatively can be expressed in terms of relative solids concentrations, for example (a) the ratio of the clarified effluent 410 concentration to the aerated inlet mixture 205 concentration (e.g., preferably less than about 0.4, or ranging from about 0.1 to about 0.3) and/or (b) the ratio of the concentrated solids effluent 310 concentration to the aerated inlet mixture 205 concentration (e.g., preferably at least about 1.5, 2, or 2.5, or ranging from about 1.5, 2, or 2.5 to about 3, 4, or 5). Insofar as any dissolved solids present in the inlet mixture are not generally recoverable using the gravimetric principles of the separation vessel, the degree of separation additionally can be expressed in terms of the non-dissolved solids (e.g., suspended and/or settleable) concentration of the concentrated solids effluent 310, which can be about 1 wt. % or less non-dissolved solids, for example about 0.01 wt. % to about 1 wt. %, about 0.02 wt. % to about 0.5 wt. %, or about 0.05 wt. % to about 0.2 wt. % non-dissolved solids.

Figure 4:
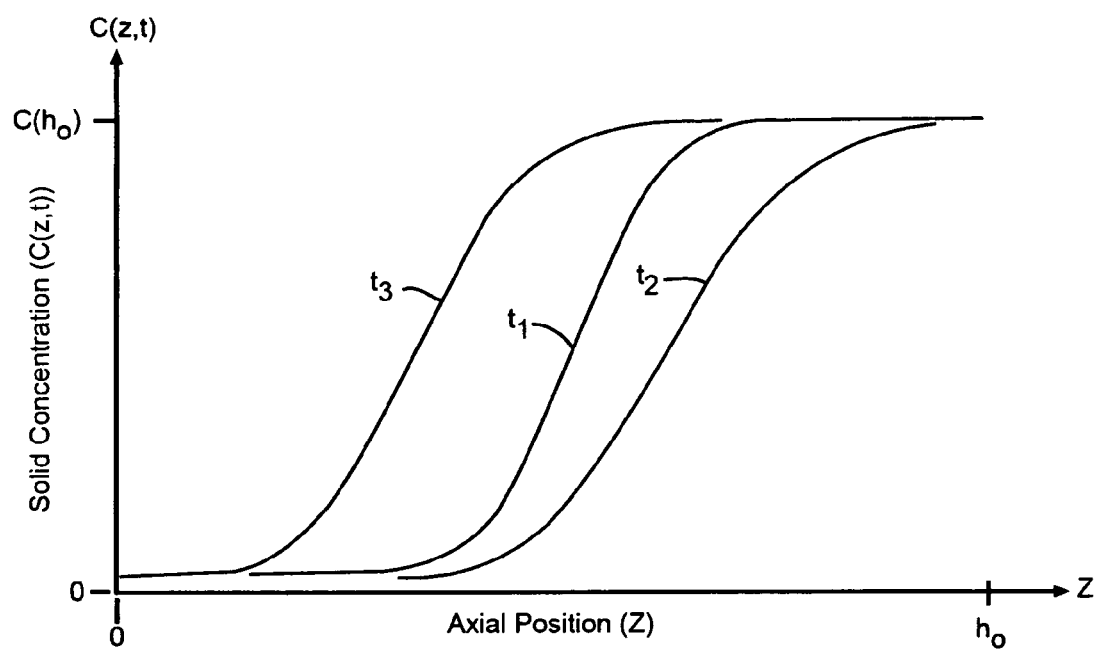
FIG. 4 illustrates hypothetical solids axial distributions at different times in the separation vessel of FIG. 1.

The control process applied to the general separation process maintains a relatively stable distribution between the lower clarified layer 130 and the upper float layer 140 in the separation vessel 100. In the idealized schematic of FIG. 1, the result is that the axial position of the interface 150 between the lower clarified layer 130 and the upper float layer 140 is relatively constant. FIG. 4 illustrates hypothetical solids distributions (i.e., solids concentration $C(z, t)$ as a function of axial position in the vessel 100) at times $t_1$, $t_2$, and $t_3$ for the case where there is a gradual transition between the upper float layer 140 and the lower clarified layer 130. The distribution $C(z, t_1)$ represents an initial, desirable distribution in the vessel 100. If the distribution between the lower clarified layer 130 and the upper float layer 140 is not relatively stable, then the distribution could change to that illustrated by $C(z, t_2)$ at a later time $t_2 > t_1$. Such a trend represents the gradual thinning of the upper float layer 140 and can result in an undesirable reduction in the concentration of the concentrated solids effluent 310 or even contamination of the concentrated solids effluent 310 with clarified fluid. Similarly, an unstable distribution could change to that illustrated by $C(z, t_3)$ at a later time $t_3 > t_1$. This opposite trend represents the gradual thickening of the upper float layer 140 and can result in contamination of the clarified effluent 410 with solids.

Previous attempts at controlling similar separation processes have been unable to maintain stable distribution between the lower clarified layer 130 and the upper float layer 140. For example, attempts to balance the inlet flowrate $Q_i$ and the outlet flowrate $Q_o$ (e.g., selecting $Q_o/Q_i$ with appropriate valve settings to be about 0.5 to account for some fraction of the aerated inlet mixture 205 that exits as concentrated solids effluent 310) have not been as efficient, resulting in unstable distributions that drift away from a desired equilibrium point. Such unstable distributions require intermittent interruptions to reset the distribution (e.g., using a cleaning process as described below), thereby disrupting the continuous nature of the process and/or the solids concentrations of the vessel outlets.

The control process applied to the disclosed separation process is a closed loop process that monitors the instantaneous height $h(t)$ of the separation vessel 100 contents (e.g., the combined height of the lower clarified layer 130 and the upper float layer 140). With reference to FIG. 1, the overflow conduit/cylindrical weir 300 has a height $h_w$ measured from the base portion 110 of the separation vessel 100. In the control process, an operating height $h_o$ is selected that is larger than $h_w$. The operating height $h_o$ represents the desired, set-point height of the top 142 of the vessel 100 contents. The height $h_o$ is larger than $h_w$ so that the upper float layer 140 will be high enough during operation to discharge the concentrated solids effluent 310 through the cylindrical weir 300. The operating height is suitably selected so that a height ratio $(h_o - h_w)/h_w$ is about 5% or less, for example about 2%, or less, about 1% or less, about 0.5% or less, about 0.1% to about 0.6%, or about 0.2% to about 0.5%. For example, in a separation vessel 100 having a diameter of about 13 ft (400 cm), a suitable weir 300 height could be about 7 ft (213 cm), and a suitable height difference $h_o - h_w$ could be about 0.1 in to about 1.5 in (0.25 cm to 3.8 cm). During the control process, the instantaneous height $h(t)$ of the separation vessel 100 contents is continuously monitored, for example with a pressure transducer 120 mounted in the base portion 110 of the vessel 100 (e.g., by correlating a measured pressure with a columnar height of fluid about the transducer) and/or a camera 124 mounted in the top portion 114 of the vessel 100 (e.g., to monitor the steady flow of harvested material over the weir 300). The method of measuring the height $h(t)$ is not particularly limited and can include any of a variety of measuring/monitoring devices (e.g., ultrasonic, pressure switch, limit switch, floating sensor, camera) and/or can include using more than one measuring device (e.g., a plurality of pressure transducers distributed throughout the vessel 100 and used to compute an average height $h(t)$). The various heights utilized in the control process (e.g., $h(t)$, $h_w$, $h_o$) are measured axially from a consistent axial reference position (e.g., a horizontal reference plane 122 that is coincident with the pressure transducer 120 illustrated in FIG. 1).

During the control process, a first error function $h(t) - h_0$ is computed as individual data points $h(t)$ are measured. The first error function $h(t) - h_0$ is used to adjust the outlet flowrate $Q_o$ according to general principles of process control so that the first error function is minimized. The outlet flowrate $Q_o$ can be adjusted by any suitable method, for example using a proportional valve (not shown) in fluid communication with the fluid outlet 400, where the proportional valve can have any of a number of incremental settings between 0% open (i.e., closed) and 100% open. Thus, in an embodiment, the first error function $h(t) - h_0$ is used to compute and select an appropriate proportional valve setting. For example when using a simple proportional (P) controller and a proportional valve, a positive first error function $h(t)-h_0>0$ indicates that the inlet mixture is accumulating in the vessel 100, and the proportional valve should be incrementally opened to increase the outlet flowrate $Q_o$; conversely, a negative first error function $h(t)-h_0<0$ indicates that $h(t)$ may drop to a point below $h_w$ that would shut off the concentrated solids effluent 310, and the proportional valve should be incrementally closed to decrease the outlet flowrate $Q_o$. In an embodiment, the data points $h(t)$ are scanned every 20 ms and measured in increments of 0.1 in (0.25 cm), and the first error function $h(t)-h_0$ is used without delay to adjust the outlet flowrate $Q_o$ according to the controlled output. However, other scanning frequencies and/or measurement increments can be used, for example in separation vessels with different geometries and/or characteristic flow rates.

While the foregoing describes the operation of a proportional (P) controller, any of a variety of other controllers also can be used, for example: proportional-integral (PI), proportional-derivative (PD), and proportional-integral-derivative (PID). The controller is preferably a PID controller, for example a programmable PID controller that is electronically interfaced with the measurement device for determining $h(t)$ (e.g., the pressure transducer) and the device for adjusting the outlet flowrate $Q_o$ (e.g., the proportional valve). The controller gain constants (i.e., $K_P$, $K_I$, and/or $K_D$ as appropriate) can be set using any or a variety of known tuning methods (e.g., manual tuning, software tuning using pre-programmed algorithms)

The control process using the first error function $h(t)-h_0$ has improved stability. Preferably, the resulting separation process is continuously operable without interruption (e.g., without a cleaning process or other intermittent process that resets the vessel conditions, for example a batch filling or batch draining operation). Alternatively, the separation process is operable for extended periods between intermittent resetting processes like the cleaning or batch drain/fill processes. Minimizing such intermittent processes increases both the net process throughput and the net solids concentration of the concentrated solids effluent 310 averaged over time (i.e., including both periods of continuous and intermittent process operation). For example, previous attempts to control the separation process using the inlet flowrate $Q_i$ and the outlet flowrate $Q_o$ (described above) nonetheless require frequent cleaning to prevent the accumulation of solids in the separation vessel, with cleaning periods lasting about 15 min being required about every 1 hr to 2 hr (i.e., about 12% to about 25% of the total operation time averaged over multiple-hour periods is dedicated to cleaning instead of continuous operation).

When included, vessel cleaning is incorporated into the overall separation process by performing successive cycles of the control process followed by a cleaning process. Similar to the control process, the cleaning process also is a closed loop process that monitors the instantaneous height $h(t)$ of the separation vessel 100 contents. In the cleaning process, a cleaning height $h_c$ is selected that is larger than $h_o$. The cleaning height $h_c$ represents an increased set-point height of the top 142 of the vessel 100 contents that will increase the flow through the cylindrical weir 300 and flush accumulating suspended solids from the vessel 100. The cleaning height is suitably selected so that a height ratio $(h_c-h_w)/h_w$ is about 5% or more, for example about 10% or more, about 5% to about 25%, or about 10% to about 10%. During the cleaning process, a second error function $h(t)-h_c$ is computed as individual data points $h(t)$ are measured. The second error function $h(t)-h_c$ is used to adjust the outlet flowrate $Q_o$ (e.g., using the above PID controller to adjust the proportional outlet valve) so that the second error function is minimized. The foregoing steps are repeated for a selected cleaning time before resuming the control process. For example, the cleaning time preferably ranges from about 0.5 min to about 6 min, about 1 min to about 5 min, or about 2 min to about 4 min performed once about every 2 hr to 3 hr (e.g., alternatively expressed as about 10% or less, about 0.1% to about 10%, about 0.3% to about 5%, about 0.6% to about 4%, or about 1% to about 3% of the total operation time averaged over multiple-hour periods that is dedicated to cleaning instead of continuous operation). Such a substantial reduction in cleaning time increases the net average solids concentration of the concentrated solids effluent 310.

Separation System

Figure 5:
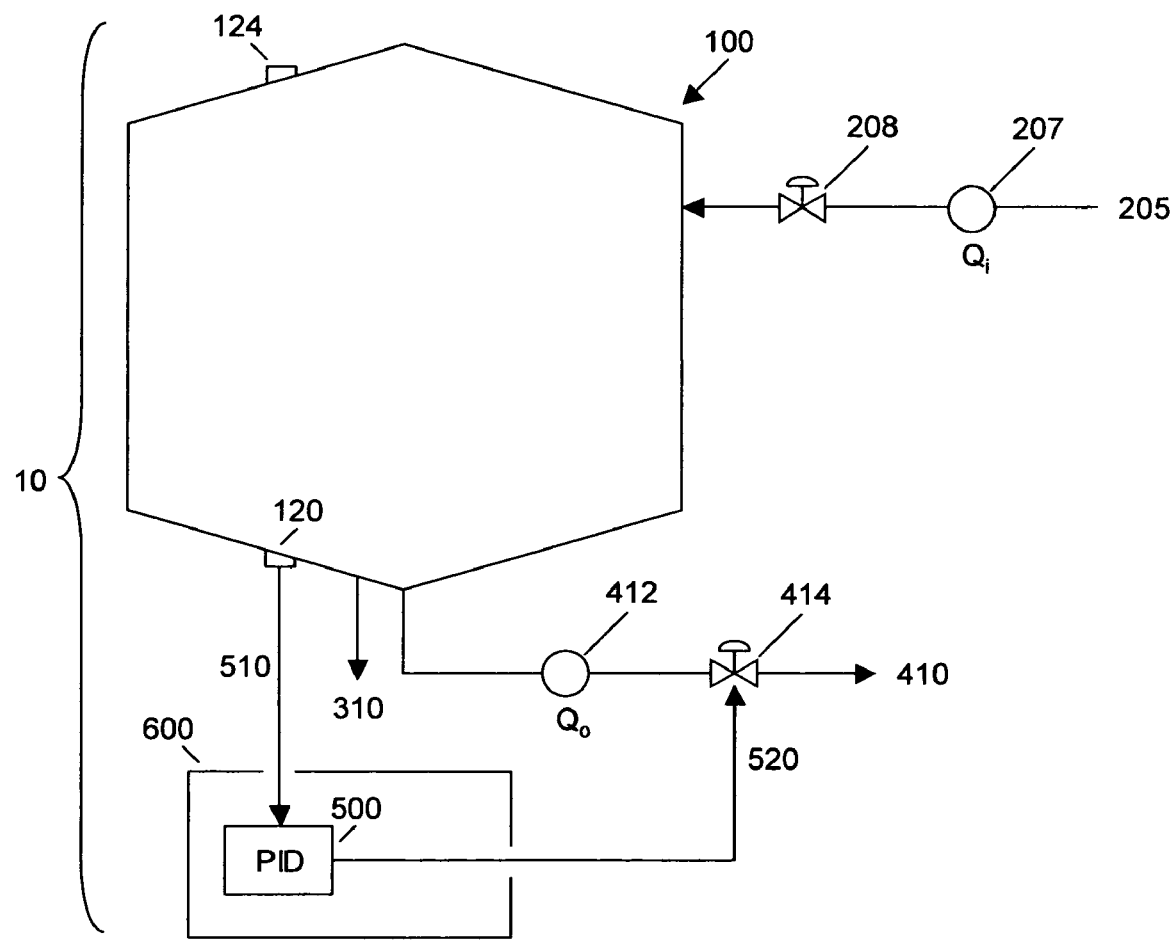
FIG. 5 is a schematic illustrating a separation system suitable for performing the disclosed process.

FIG. 5 is a schematic illustrating a separation system 10 suitable for performing the disclosed separation process, for example using the separation vessel 100. A flowmeter 207 (measuring $Q_i$) and a valve 208 (e.g., a proportional valve) are in fluid communication with the aerated inlet mixture 205 fed to the separation vessel 100 via the fluid inlet. Similarly, a flowmeter 412 (measuring $Q_o$) and a valve 414 (e.g., a proportional valve) are in fluid communication with the clarified fluid effluent 410 exiting the separation vessel 100 via the fluid outlet. The flowmeters 207 and 412 can be upstream (as illustrated) or downstream of their respective valves 208 and 414. The valve 414 more generally represents any suitable means for adjusting the flowrate $Q_o$ of fluid out of the separation vessel through the fluid outlet (i.e., the clarified fluid effluent 410), for example including any know fluid mechanical means of applying/releasing back pressure on the flow line, altering the cross-sectional area available for flow, etc.

The system 10 further includes an electronic controller 500. The electronic controller 500 can suitably be a P, PI, PD, or PID (preferable; for example Allen Bradley controllers available from Rockwell Automation, Milwaukee, Wis.). The electronic controller 500 has an input 510 in electrical communication with (or electrically connected to) a means for measuring an instantaneous height $h(t)$ of the separation vessel contents (e.g., the lower clarified layer 130 and the upper float layer 140 as illustrated in FIG. 1). As illustrated, the measuring means for the instantaneous height $h(t)$ can be the pressure transducer 120, although other measuring mechanisms described above are also suitable. The measuring means is mounted on the separation vessel 100 at a position between the base portion of the vessel 100 (inclusive of being mounted on the base portion; preferred) and the height $h_w$ of the overflow conduit of the vessel 100. The input 510 allows the controller 500 to periodically measure the instantaneous height $h(t)$ (e.g., at any prescribed interval) and to compare the instantaneous height $h(t)$ with the user-defined operating height $h_o$ (i.e., the set-point) to compute first error function $h(t)-h_0$. The electronic controller 500 further has an output 520 in electrical communication with (or electrically connected to) the means for adjusting the flowrate $Q_o$ (e.g., the valve 414 as illustrated). During operation, the output 520 from the controller 500 based on the first error function $h(t)-h_0$ adjusts the flowrate $Q_o$, for example by attenuating the (proportional) valve 414 according the controller 500 logic.

The electronic controller 500 can be integrated into a computer system 600 for controlling/monitoring other aspects of the system 10 and its associated process. The computer system 600 can include any generalized or specific collection of computer components (e.g., processor, memory, display, storage medium (for data and/or program storage), I/O ports). The computer system 600 can perform a variety of process control and/or monitoring functions, for example data logging/viewing (e.g., flowrate $Q_i$, flowrate $Q_o$, real-time images from the camera 124), manual process control (e.g., manually setting the valve 208 and 414 positions to control process flowrates), process parameter input (e.g., set-point values for $h_o$ and $h_c$, scanning rates for h(t), frequency of controller 500 output, controller 500 tuning constants, cleaning schedule). The computer system 600 can include other electronic controllers (not shown), for example a second controller that uses the flowrate $Q_i$ as an input to compute an additional error function that can be used to adjust the flowrate $Q_o$ in an attempt to maintain steady operation of the separation vessel.

Example Application—Manure Management Process

Figure 6:
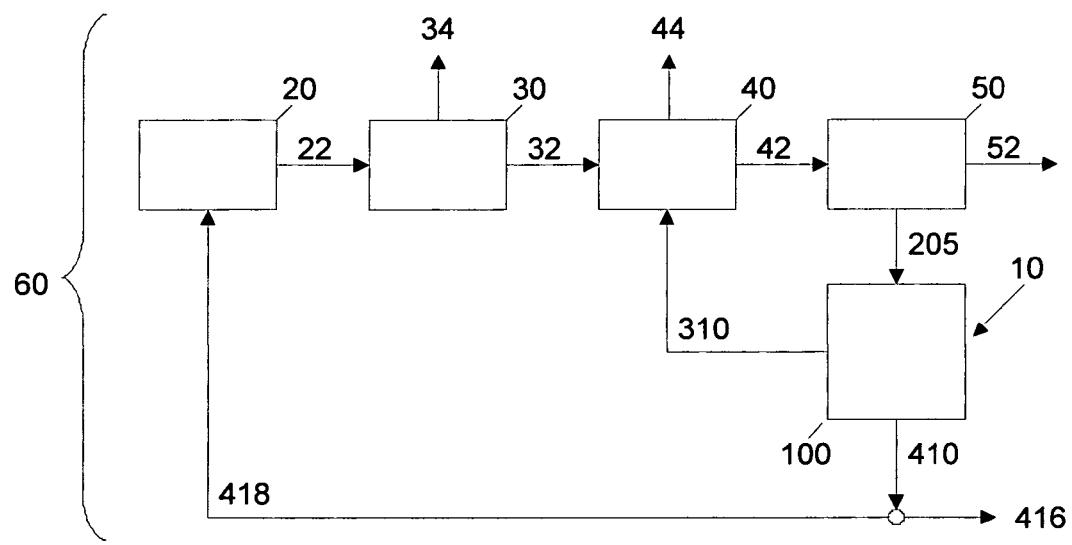
FIG. 6 is a process flow diagram illustrating a manure management process incorporating the disclosed separation process and system.

The disclosed process, its associated separation vessel 100, and its associated separation system 10 can be incorporated into any of a variety of solid-liquid separation processes. FIG. 6 is a process flow diagram illustrating a manure management process 60 (e.g., in a sand bedded dairy) incorporating the disclosed separation process and system 10. Manure generated in large quantities (e.g., as a result of farming or dairy operations) can be used as source for generating biogas; however, such a process generates a solid-liquid waste stream as a by-product that must be further processed. In the following general description, each of the individual unit operations 10, 20, 30, 40, and 50 can generally include one or more than one unit in series and/or parallel to accommodate the net capacity of the process 60.

For example, a source of manure 20 is mixed with a liquid medium (e.g., water, such as a recycled portion 418 of the clear run effluent 410 (or a parlor flush)) to form a manure slurry 22. The manure 20 generally contains a substantial amount of sand and other coarse solids, so the manure slurry 22 is fed to a de-sander 30 (e.g., a sand separator or hydrocyclone). The de-sander generates a coarse solid waste stream 34 and a solid-liquid slurry 32 containing relatively finer solids (e.g., settleable solids, suspended solids, dissolved solids). The solid-liquid slurry 32 is fed to a digester 40 (e.g., anaerobic) in which bacteria digest the finer manure solids to generate a biogas 44 product stream and a solid-liquid digester effluent 42. A portion of the biogas 44 can be recycled for use in the process 60 as an aerating gas for the aerated inlet mixture 205. The solid-liquid digester effluent 42 is treated in a two-step process to remove solids, being fed first to a primary solid-liquid separator 50 (e.g., a screw press) to remove larger solids (e.g., settleable solids and larger) as a waste stream 52 which can be used, for example, for land application. The finer, suspended and dissolved solids exiting from the separator 50 are fed as the aerated inlet mixture 205 to the separation vessel 100/system 10 (e.g., after the addition of an aerating gas, flocculating agents, coagulating agents, etc.). As shown, a portion of the concentrated solids effluent 310 is recycled to digester 40 as a source of microorganisms and supplemental feed, although some or all of the effluent 310 can be further dried (e.g., horizontal decanter, etc.) and land-applied at agronomic rates beneficial to soil and crops. A portion 416 of the clarified fluid effluent (or tea water) 410 is preferably used to conserve potable water (e.g., as irrigation water, for parlor flushes, etc.). Another portion (not shown) can be recycled and combined with a portion of the biogas 44 to form an aerated liquid stream combined with the finer/dissolved solids exiting from the separator 50.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Combinations of components are contemplated to include homogeneous and/or heterogeneous mixtures, as would be understood by a person of ordinary skill in the art in view of the foregoing disclosure.

What is claimed is:

1. A separation process comprising:
   (a) providing a separation vessel comprising (i) a fluid inlet, (ii) a solids outlet comprising an overflow conduit having a height $h_w$ measured from a base portion of the separation vessel, and (iii) a fluid outlet at a first position between the base portion and $h_w$;
   (b) feeding an aerated inlet mixture to the separation vessel via the fluid inlet at a flowrate $Q_i$, the aerated inlet mixture comprising (i) a fluid, (ii) a solid contaminant, and (iii) an aerating gas;
   (c) separating the inlet mixture in the separation vessel into (i) an upper float layer comprising aerated solids and being located at a second position, and (ii) a lower clarified layer comprising a clarified fluid and being located at a third position, the second position being relatively further away from the base portion of the separation vessel than the third position;
   (d) withdrawing the upper float layer from the separation vessel via the overflow conduit;
   (e) withdrawing the lower clarified layer from the separation vessel via the fluid outlet at a selected flowrate $Q_o$; and
   (f) performing (a)-(e) as a continuous separation process with a control process comprising:
      (i) selecting an operating height $h_o$ that is larger than $h_w$;
      (ii) measuring an instantaneous height h(t) of the separation vessel contents;
      (iii) adjusting the flowrate $Q_o$ based on a first error function $h(t)-h_0$ to minimize the first error function; and
      (iv) repeating (i)-(iii) of the control process.

2. The process of claim 1, wherein:
   (i) the separation vessel comprises a cylindrical outer wall generally defining a central axis;
   (ii) the fluid inlet comprises one or more tangential inlets distributed around the cylindrical outer wall, thereby generating a swirling flow when feeding the aerated inlet mixture to the separation vessel; and
   (iii) the overflow conduit comprises a cylindrical weir generally aligned with the central axis.

3. The process of claim 1, wherein the separation vessel is closed to the external environment.

4. The process of claim 1, wherein the aerating gas comprises one or more of air, nitrogen, oxygen, carbon dioxide, methane, and biogas.

5. The process of claim 4, wherein the aerating gas is substantially free of oxygen.

6. The process of claim 1, wherein the aerated inlet mixture comprises one or more flocculating agents, coagulating agents, or combinations thereof.

7. The process of claim 1, wherein the aerating gas is ionized and is electrostatically coupled to the solid contaminant.

8. The process of claim 1, wherein the aerated inlet mixture comprises about 1 wt. % to about 5 wt. % total solids.

9. The process of claim 1, wherein the lower clarified layer withdrawn via the fluid outlet comprises about 1 wt. % or less total solids.

10. The process of claim 1, wherein the upper float layer withdrawn via the overflow conduit comprises at least about 5 wt. % total solids.

11. The process of claim 1, wherein the operating height is selected so that a height ratio $(h_0-h_w)/h_w$ is about 0.05 or less.

12. The process of claim 1, wherein (f)(ii) of the control process comprises measuring the instantaneous height h(t) with a pressure transducer mounted within the separation vessel.

13. The process of claim 1, wherein (f)(iii) of the control process comprises adjusting the flowrate $Q_o$ with a proportional valve in fluid communication with the fluid outlet.

14. The process of claim 1, wherein the continuous separation process comprises performing successive cycles of the control process followed by a cleaning process, the cleaning process comprising:
  (i) selecting an cleaning height $h_c$ that is larger than $h_o$;
  (ii) measuring an instantaneous height h(t) of the separation vessel contents;
  (iii) adjusting the flowrate $Q_o$ based on a second error function $h(t)-h_c$ to minimize the second error function; and
  (iv) repeating (i)-(iii) of the cleaning process for a selected cleaning time before resuming the control process.

15. The process of claim 14, wherein the cleaning height is selected so that a height ratio $(h_c-h_w)/h_w$ is about 0.05 or more.

16. The process of claim 1, comprising performing the continuous separation process without a cleaning cycle.

17. A separation process comprising:
(a) providing a separation vessel comprising (i) a cylindrical outer wall generally defining a central axis, (ii) a fluid inlet comprising one or more tangential inlets distributed around the cylindrical outer wall and capable of generating a swirling flow when feeding an inlet mixture to the separation vessel, (iii) a solids outlet comprising a cylindrical weir generally aligned with the central axis and having a height $h_w$ measured from a base portion of the separation vessel, and (iv) a fluid outlet at a first position between the base portion and $h_w$;
(b) feeding an aerated inlet mixture to the separation vessel via the fluid inlet at a flowrate $Q_i$, the aerated inlet mixture comprising (i) a fluid, (ii) a solid contaminant, and (iii) an aerating biogas;
(c) separating the inlet mixture in the separation vessel into (i) an upper float layer comprising aerated solids and being located at a second position, and (ii) a lower clarified layer comprising a clarified fluid and being located at a third position, the second position being relatively further away from the base portion of the separation vessel than the third position;
(d) withdrawing the upper float layer from the separation vessel via the cylindrical weir;
(e) withdrawing the lower clarified layer from the separation vessel via the fluid outlet at a selected flowrate $Q_o$; and
(f) performing (a)-(e) as a continuous separation process with a control process comprising:
  (i) selecting an operating height ho that is larger than $h_w$;
  (ii) measuring an instantaneous height h(t) of the separation vessel contents with a pressure transducer mounted within the separation vessel;
  (iii) adjusting the flowrate $Q_o$ with a proportional valve in fluid communication with the fluid outlet based on a first error function $h(t)-h_0$ to minimize the first error function; and (iv) repeating (i)-(iii) of the control process.

* * * * *